(12) United States Patent
Burnside et al.

(10) Patent No.: US 11,162,535 B2
(45) Date of Patent: Nov. 2, 2021

(54) BEARING FOR USE IN HIGH SPEED APPLICATION

(71) Applicants: Rolls-Royce Corporation, Indianapolis, IN (US); Rolls-Royce North American Technologies Inc., Indianapolis, IN (US)

(72) Inventors: Phillip H. Burnside, Avon, IN (US); Andrew Schwendenmann, Avon, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 128 days.

(21) Appl. No.: 16/739,968

(22) Filed: Jan. 10, 2020

(65) Prior Publication Data
US 2020/0224721 A1 Jul. 16, 2020

Related U.S. Application Data

(60) Provisional application No. 62/792,595, filed on Jan. 15, 2019.

(51) Int. Cl.
*F16C 33/66* (2006.01)
*F02C 7/06* (2006.01)
*F16C 19/16* (2006.01)

(52) U.S. Cl.
CPC ............ *F16C 33/6659* (2013.01); *F02C 7/06* (2013.01); *F16C 19/16* (2013.01); *F16C 33/6681* (2013.01); *F05D 2220/32* (2013.01); *F05D 2240/50* (2013.01); *F16C 2300/22* (2013.01); *F16C 2360/23* (2013.01)

(58) Field of Classification Search
CPC .. F16C 19/16; F16C 33/6659; F16C 33/6662; F16C 33/6681; F16C 2300/22; F16C 2360/23; F05D 2240/50; F05D 2240/54; F02C 7/06
See application file for complete search history.

(56) References Cited

U.S. PATENT DOCUMENTS

| 3,066,990 A | 12/1962 | Frohlich |
| 3,266,596 A | 8/1966 | Blackhurst et al. |
| 3,378,104 A | 4/1968 | Venable |

(Continued)

FOREIGN PATENT DOCUMENTS

| EP | 0026488 A2 | 4/1984 |
| EP | 1811190 A1 | 7/2007 |

(Continued)

OTHER PUBLICATIONS

Extended European Search Report, European Application No. 19215169.4-1009, dated May 4, 2020, 10 pages.

*Primary Examiner* — Phillip A Johnson
(74) *Attorney, Agent, or Firm* — Barnes & Thornburg LLP

(57) ABSTRACT

A bearing system includes bearing unit and a side-jet injector. The bearing unit includes an outer race, a plurality of internal rotating components, and an inner race. The side-jet injector includes an injector for delivering a lubrication source to the plurality of rotating components to withdraw heat generated and lubricate the bearing unit during operation of the bearing system.

20 Claims, 4 Drawing Sheets

(56) References Cited

U.S. PATENT DOCUMENTS

| | | | |
|---|---|---|---|
| 3,722,967 A * | 3/1973 | Lewis | F16C 19/26 |
| | | | 384/466 |
| 4,342,489 A * | 8/1982 | Lenz | F16C 33/6659 |
| | | | 184/6.11 |
| 4,858,427 A | 8/1989 | Provenzano | |
| 5,201,845 A | 4/1993 | Allmon et al. | |
| 5,636,708 A * | 6/1997 | Wedeven | F01D 25/18 |
| | | | 184/6.22 |
| 6,132,094 A | 10/2000 | Cornelison et al. | |
| 6,398,833 B1 | 6/2002 | Santerre et al. | |
| 6,409,464 B1 | 6/2002 | Fisher et al. | |
| 6,640,933 B2 | 11/2003 | Henry et al. | |
| 6,682,222 B2 | 1/2004 | Fisher | |
| 6,698,097 B1 | 3/2004 | Miura et al. | |
| 6,827,494 B2 | 12/2004 | Aguilar | |
| 7,470,064 B2 | 12/2008 | Link et al. | |
| 7,935,164 B2 | 5/2011 | Fang et al. | |
| 7,984,792 B2 | 7/2011 | Hoffmann et al. | |
| 7,993,425 B2 | 8/2011 | Corattiyil et al. | |
| 8,021,105 B2 | 9/2011 | Ammann et al. | |
| 8,443,843 B2 | 5/2013 | Mount et al. | |
| 8,517,612 B2 | 8/2013 | Metzger et al. | |
| 8,621,839 B2 | 1/2014 | Alecu et al. | |
| 9,033,581 B2 | 5/2015 | Carter et al. | |
| 9,121,303 B2 | 9/2015 | Dobek et al. | |
| 9,441,541 B2 | 9/2016 | Wotzak | |
| 9,822,817 B2 | 11/2017 | Price et al. | |
| 9,874,244 B2 | 1/2018 | Grillo et al. | |
| 9,897,005 B2 | 2/2018 | Chilton et al. | |
| 10,544,834 B1 | 1/2020 | Burnside et al. | |
| 2003/0010572 A1 | 1/2003 | Henry et al. | |
| 2005/0047690 A1 | 3/2005 | Keramati et al. | |
| 2008/0135336 A1 | 6/2008 | Jewess et al. | |
| 2009/0133581 A1 | 5/2009 | Fang et al. | |
| 2009/0218170 A1 | 9/2009 | Hoffmann et al. | |
| 2009/0220330 A1 | 9/2009 | Henry et al. | |
| 2009/0294216 A1 | 12/2009 | Begin et al. | |
| 2012/0192572 A1 | 8/2012 | Miller | |
| 2014/0116786 A1 | 5/2014 | Cooley et al. | |
| 2014/0230422 A1 | 8/2014 | Placha | |
| 2014/0248015 A1 | 9/2014 | Yamamoto et al. | |
| 2015/0135663 A1 | 5/2015 | Beier et al. | |
| 2018/0094543 A1 * | 4/2018 | Fang | F02C 7/06 |

FOREIGN PATENT DOCUMENTS

| | | | |
|---|---|---|---|
| GB | 2226608 A | 7/1990 | |
| JP | 2005024093 A * | 1/2005 | F01D 25/18 |
| JP | 6130842 B2 * | 5/2017 | F16C 33/3887 |

\* cited by examiner

BEARING FOR USE IN HIGH SPEED APPLICATION

CROSS REFERENCE TO RELATED APPLICATIONS

This application claims priority to and the benefit of U.S. Provisional Patent Application No. 62/792,595, filed 15 Jan. 2019, the disclosure of which is now expressly incorporated herein by reference.

FIELD OF THE DISCLOSURE

The present disclosure relates to bearing assemblies, particularly those including internal rotating components such as balls or rollers. More particularly, the present disclosure relates to bearing assemblies that are lubricated during operation.

BACKGROUND

Bearing assemblies are typically used to transfer loads between a rotating component and a fixed component or between two rotating components that move relative to one another. These bearing assemblies may be rotated at high speeds and may be subject to friction and/or elevated temperatures due to the high rotational speeds. Lubricants, such as oil, may be used to reduce friction in a bearing assembly and remove heat generated in the bearing assembly during operation.

Bearing assemblies used in high-speed applications may be difficult to lubricate due to the presence of forces caused by the high rotational speeds of the bearing assembly. One such force that may be generated by a high-speed bearing assembly is windage that flows circumferentially around the rotating component as the component rotates about an axis. Systems used to reduce or bypass the windage effects in high-speed applications may be complex and costly while less complex and less costly systems may not provide adequate lubrication capture efficiencies in the bearings when used in a high rotational speed environment. As such, there exists a need to provide a simple and cost-effective system for lubricating high-speed bearing assemblies while reducing the effects of windage.

SUMMARY

The present disclosure may comprise one or more of the following features and combinations thereof.

According to the present disclosure, a bearing assembly includes a bearing housing, a bearing, and a side-jet injector. The bearing housing may be formed include a space therein. The bearing may be coupled to the bearing housing and may be located in the space. The bearing may be adapted to support a component rotating about a central axis relative to the bearing housing. The side-jet injector may be configured to provide lubrication to the bearing during rotation of the component. The side-jet injector may be located in spaced-apart relation to the bearing and in a fixed position relative to the bearing and the housing. The side-jet injector may be configured to inject a stream of lubrication from an outlet formed in the side-jet injector in an axial direction toward the plurality of internal rotating components.

The bearing housing may include a first wall section located a first radial distance from the central axis and a second wall section located a relatively grater second radial distance from the central axis. The second wall section may be located circumferentially downstream of the first wall section. The first and second wall sections may cooperate to establish a zone of stagnate fluid radially between the component and the second wall section and circumferentially downstream of the first wall section. The outlet of the side-jet injector may be located circumferentially downstream of the first wall section and radially between an outer surface of the component and the second wall section such that effects to the stream of lubrication from windage established between the first wall section and the component is minimized.

In some embodiments, the zone of stagnant fluid may have a boundary line radially between an inner surface of the second wall section and an outer surface of the component. The outlet of the side-jet injector may be positioned radially adjacent to the boundary line.

In some embodiments, the outlet of the side-jet injector may be aligned radially with the boundary line. In some embodiments, the space may be aligned radially with the boundary line. In some embodiments, the outlet of the side-jet injector may be located radially in the zone of stagnant fluid.

In some embodiments, the bearing may include an outer race, an inner race, and a plurality of internal rotating members. The outer race may be coupled to the second wall section. The inner race may be coupled to the component. The plurality of internal rotating members may be located radially between the outer race and the inner race.

In some embodiments, the second wall section may form a complete circle around the central axis. The first wall section may extend only partway around the central axis.

In some embodiments, the outer race has a first radial thickness. The first wall section has a second radial thickness that may be about equal to the first radial thickness.

In some embodiments, an inner surface of the outer race may be aligned with an inner surface of the first wall section. In some embodiments, the outlet of the side-jet injector may be positioned radially adjacent to the inner surface of the outer race and the inner surface of the first wall section.

In some embodiments, the outlet of the side-jet injector may be positioned directly inward of the inner surface of the outer race and the inner surface of the first wall section. In some embodiments, the bearing further includes a cage. The space may be defined radially between an inner surface of the outer race and an outer surface of the cage.

According to another aspect of the disclosure, a gas turbine engine includes a case, a rotor, a bearing, and a side-jet injector. The case may be formed to include a space therein. The rotor may be located in the space and adapted for rotation in a first direction about a central axis relative to the case. The rotor may be configured to generate a windage that flows in the first direction during rotation of the rotor about the central axis. The bearing may be arranged to extend between and interconnect the rotor and the case to support the rotor. The side-jet injector may be configured to provide lubrication to the bearing during rotation of the rotor. The side-jet injector may be coupled to the case in a fixed position relative to the bearing and the rotor and configured to inject a stream of lubrication from an outlet formed in the side-jet injector in an axial direction toward the bearing system to lubricate and cool the bearing.

The case may include a first wall section located a first radial distance from the central axis and a second wall section located a relatively grater second radial distance from the central axis. The second wall section may be located circumferentially downstream of the first wall section. The first and second wall sections may cooperate to establish a zone of stagnate fluid radially between the rotor and the second wall section and circumferentially downstream of the first wall section. The outlet of the side-jet injector is located circumferentially downstream of the first wall section and radially between an outer surface of the rotor and the second wall section such that effects to the stream from windage established between the first wall section and the component are minimized.

In some embodiments, the zone of stagnant fluid may have a boundary line radially between an inner surface of the second wall section and an outer surface of the rotor. The outlet of the side-jet injector may be positioned radially adjacent to the boundary line.

In some embodiments, the outlet of the side-jet injector may be aligned radially with the boundary line. In some embodiments, the space may be aligned radially with the boundary line. In some embodiments, the outlet of the side-jet injector may be located radially in the zone of stagnant fluid.

In some embodiments, the bearing may include an outer race, an inner race, and a plurality of internal rotating members. The outer race may be coupled to the second wall section. The inner race may be coupled to the rotor. The plurality of internal rotating members may be located radially between the outer race and the inner race.

In some embodiments, the second wall section may form a complete circle around the central axis. The first wall section may extend only partway around the central axis.

In some embodiments, the outer race has a first radial thickness. The first wall section may have a second radial thickness that is about equal to the first radial thickness.

In some embodiments, an inner surface of the outer race may be aligned with an inner surface of the first wall section. In some embodiments, the outlet of the side-jet injector may be positioned radially adjacent to the inner surface of the outer race and the inner surface of the first wall section.

In some embodiments, the outlet of the side-jet injector may be positioned directly inward of the inner surface of the outer race and the inner surface of the first wall section. In some embodiments, the bearing may include a cage. The space may be defined radially between an inner surface of the outer race and an outer surface of the cage.

These and other features of the present disclosure will become more apparent from the following description of the illustrative embodiments.

BRIEF DESCRIPTION OF THE DRAWINGS

The detailed description particularly refers to the accompanying figures in which.

DETAILED DESCRIPTION

Figure 1:
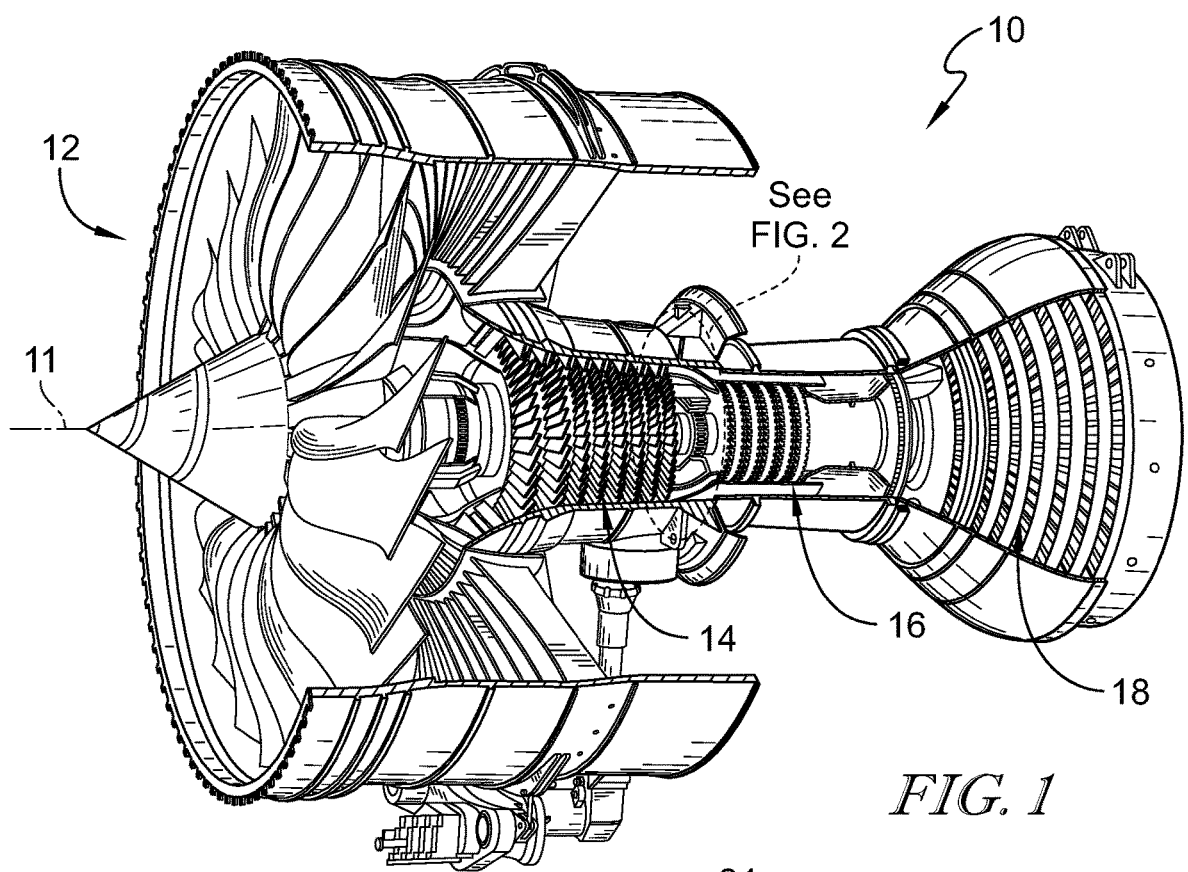
FIG. 1 is a perspective view of a gas turbine engine in accordance with the present disclosure, the gas turbine engine includes a bearing system and a high-speed rotor adapted to rotate about a central reference axis, the bearing system being configured to transfer axial loads between the rotor and a bearing housing included in the bearing system.

For the purposes of promoting an understanding of the principles of the disclosure, reference will now be made to a number of illustrative embodiments illustrated in the drawings and specific language will be used to describe the same.

An illustrative gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central reference axis 11 and drive the compressor 14 and the fan 12.

Each of the fan 12, compressor 14, the combustor 16, and the turbine 18 may be connected to each other via one or more rotors 20 that also rotate about the central reference axis 11 during operation of the gas turbine engine 10. The rotor 20 may experience loads in radial and/or axial directions as the rotor 20 is rotated about the central axis 11. To support these loads, the gas turbine engine 10 further includes a bearing system 22 that extends circumferentially around the rotor 20 and engages the rotor 20 to transfer the loads experienced by the rotor 20 to the bearing system 22.

Figure 2:
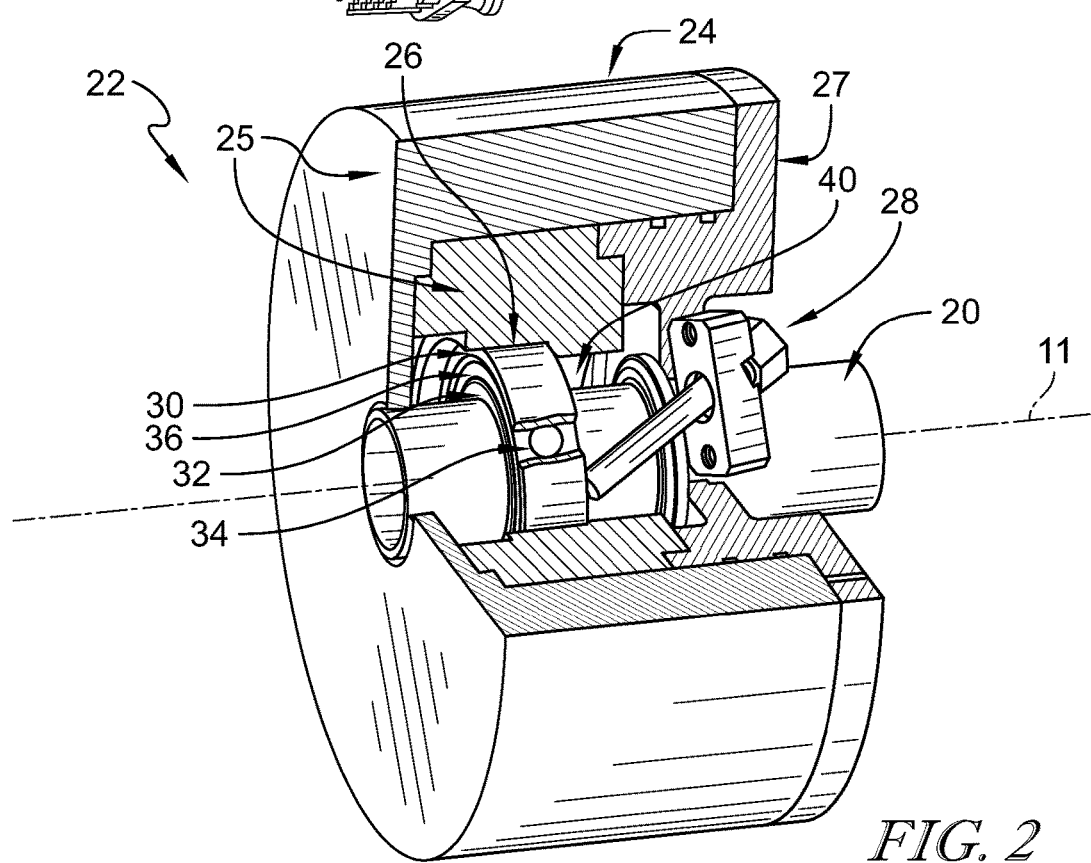
FIG. 2 is a perspective and partial cross sectional view of the bearing system showing that the bearing system includes a side-jet injector configured to inject a stream of lubrication into the bearing system, the side-jet injector located in a cavity formed between the rotor and the bearing housing.

The bearing system 22 includes a bearing housing 24, a bearing unit 26, and a side-jet injector 28 as shown in FIG. 2. The bearing housing 24 is fixed relative to the central axis 11 and is configured to support at least a portion of the bearing unit 26. The bearing unit 26 is located radially between the rotor 20 and the bearing housing 24 to transfer the loads from the rotor 20 to the bearing housing 24. At least a portion of the bearing unit 26 is coupled to the rotor 20 for rotation therewith. Heat and friction may be generated within the bearing unit 26 as the rotor 20 rotates about the central reference axis 11. The side-jet injector 28 is configured to inject a stream of lubrication into the bearing unit 26 during operation of the gas turbine engine 10 to lubricate and cool the bearing unit 26.

The bearing housing 24 includes a case 25 and an optional end plate 27 as shown in FIG. 2. The case 25 extends circumferentially around the bearing unit 26 and the rotor 20. The end plate 27 is located axially aft of the bearing unit 26 and the case 25. The side-jet injector 28 extends axially through the end plate 27 and into confronting relation with the bearing unit 26 to provide the lubrication source to the bearing unit 26.

The bearing unit 26 is adapted for high speed applications and includes an outer race 30, an inner race 32, a plurality of rotating components 34, and a cage 36 for supporting the rotating components 34 as shown in FIG. 2. The outer race 30 is positioned radially outward of the inner race 32 and is coupled to the bearing housing 24. The inner race is mounted to the rotor 20 for rotation therewith about the central axis 11. The cage 36 is formed to include a plurality of bearing apertures 38 that receive individual rotating components 34 to maintain circumferential spacing between each of the rotating components 34. The cage 36 and plurality of internal rotating components 34 are both positioned radially between the outer race 30 and the inner race 32 to facilitate rotation of the inner race 32 relative to the outer race 30. The plurality of rotating components 34 are spherical (e.g., ball bearings); however, other rotating components, such as, for example, cylindrical roller bearings, may also be used.

Figure 3:
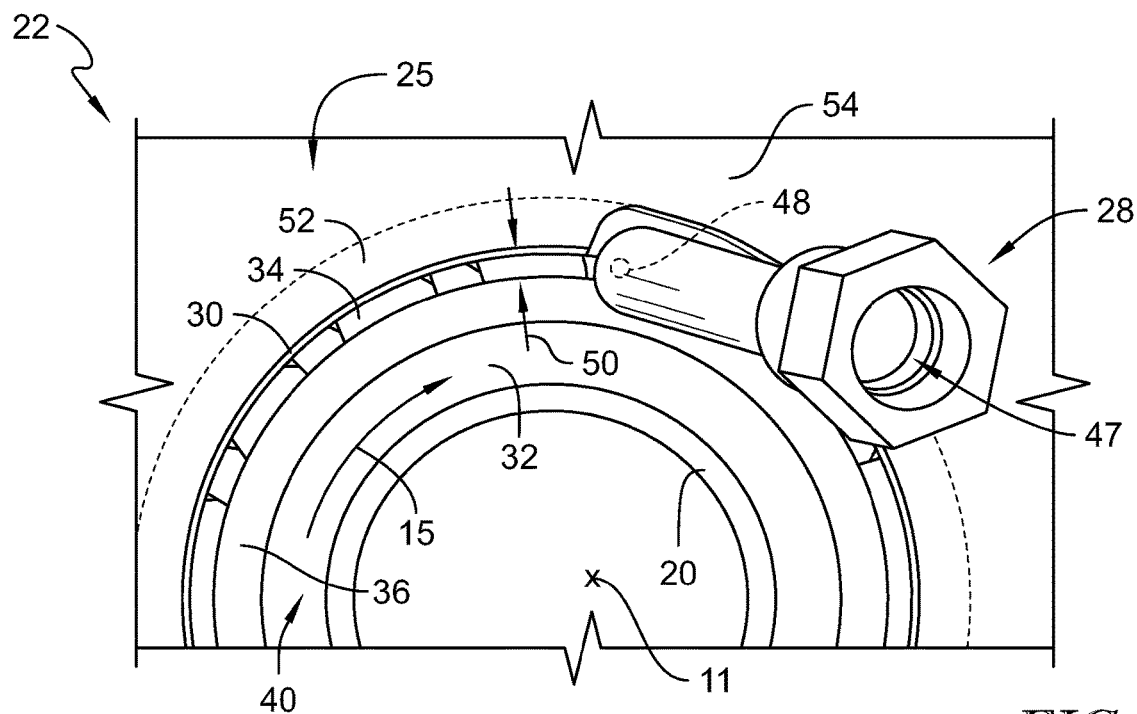
FIG. 3 is an elevation view from an aft end of the bearing system with a portion of the bearing housing removed to show that the bearing housing includes a first wall section and a second wall section offset radially and circumferentially from the first wall section to provide a zone of stagnant fluid circumferentially downstream of the first wall section and the side-jet injector is at least partially received in the zone of stagnant fluid.
Figure 4:
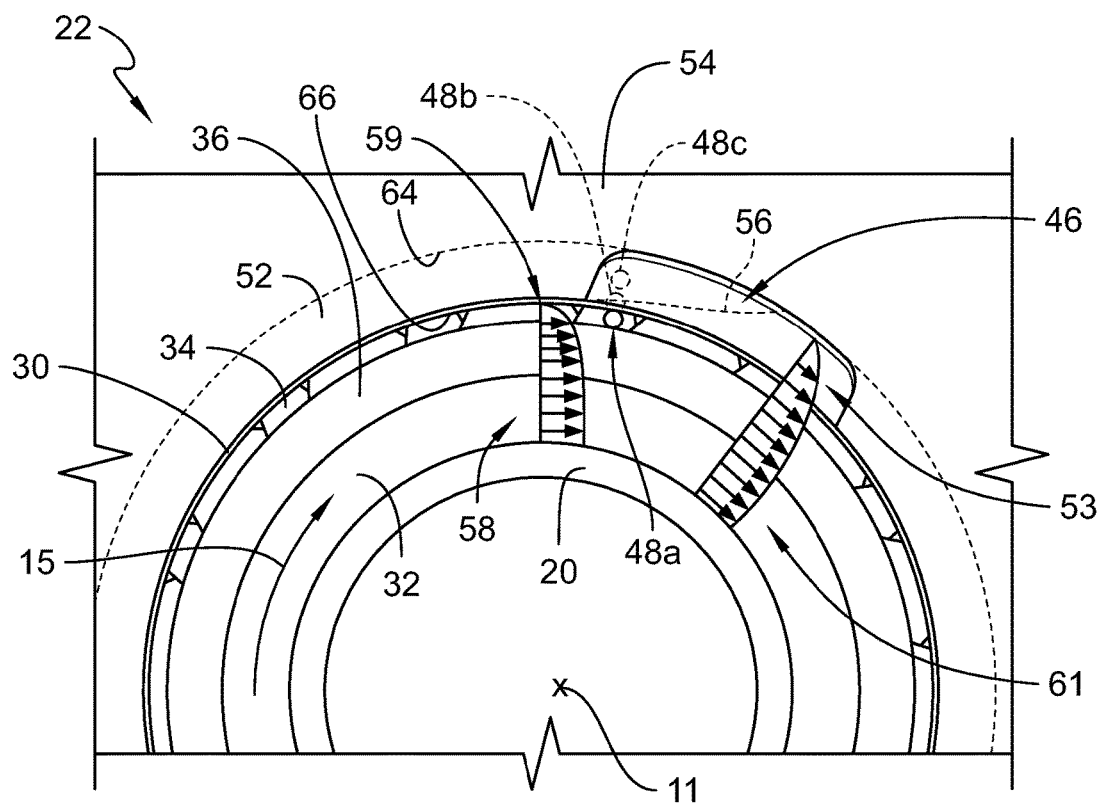
FIG. 4 is an elevation view from an aft end of the bearing system similar to FIG. 3 but with the side-jet injector removed and with illustrative windage flow profiles added within the cavity representing how different windage flow profiles and the zone of stagnant fluid are established between the wall sections and the rotor due to the offset between the first wall section and the second wall section.
Figure 5:
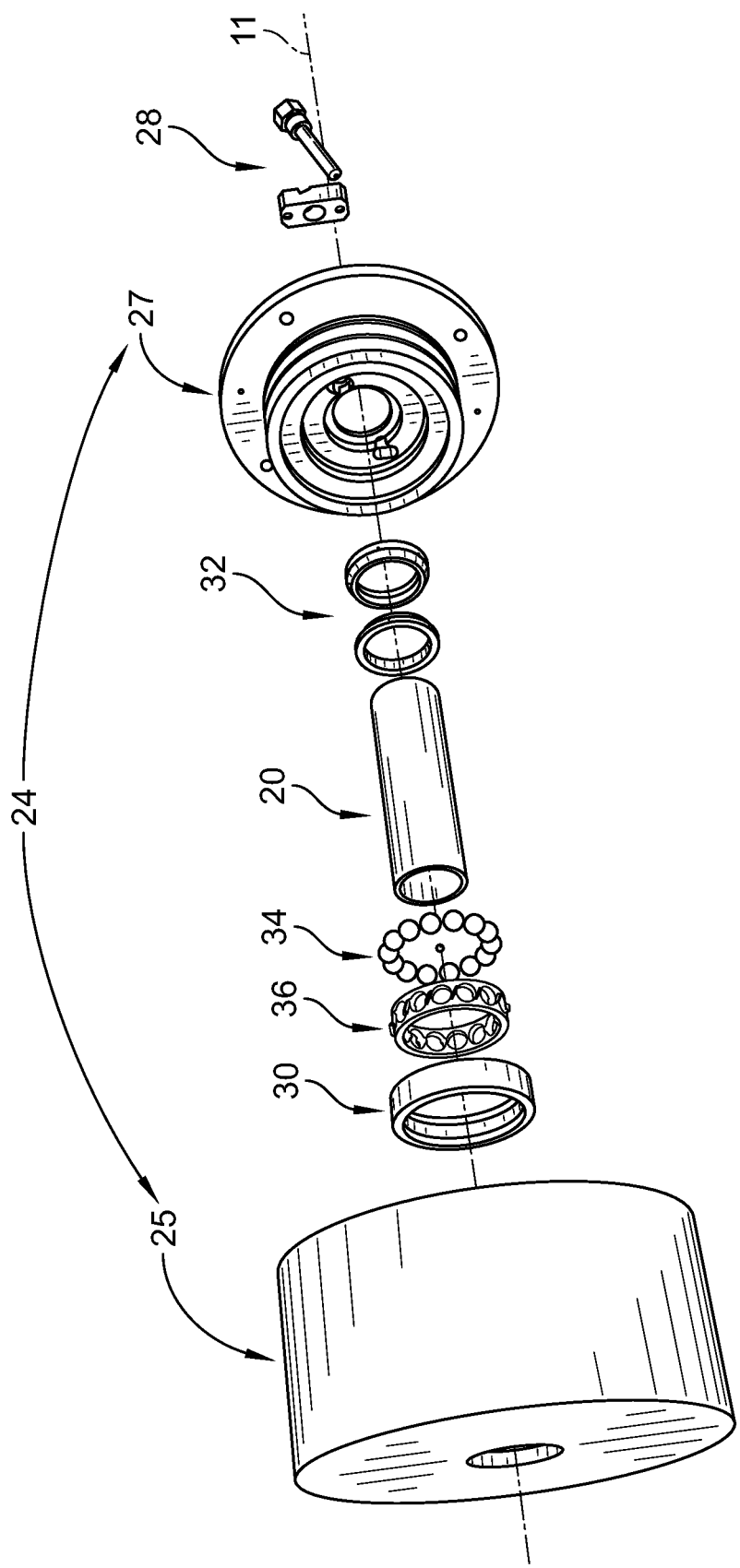
FIG. 5 is an exploded assembly view of the bearing system of FIGS. 1-4.

A cavity 40 is formed between the bearing housing 24 and the rotor 20 axially-aft of the bearing unit 26 as shown in FIGS. 2-4. The side-jet injector 28 extends into the cavity 40 to deliver a stream of lubrication to the bearing unit 26. The side-jet injector 28 is illustratively embodied as a tubular member defining a passageway 47 that directs the lubrication source toward the bearing unit 26. The side-jet injector 28 extends into the cavity 40 from an aft end of the bearing system 22. The side-jet injector 28 is formed to include an outlet 48 that is positioned adjacent to the bearing unit 26 as shown in FIGS. 3-4 and 6-7.

Figure 6:
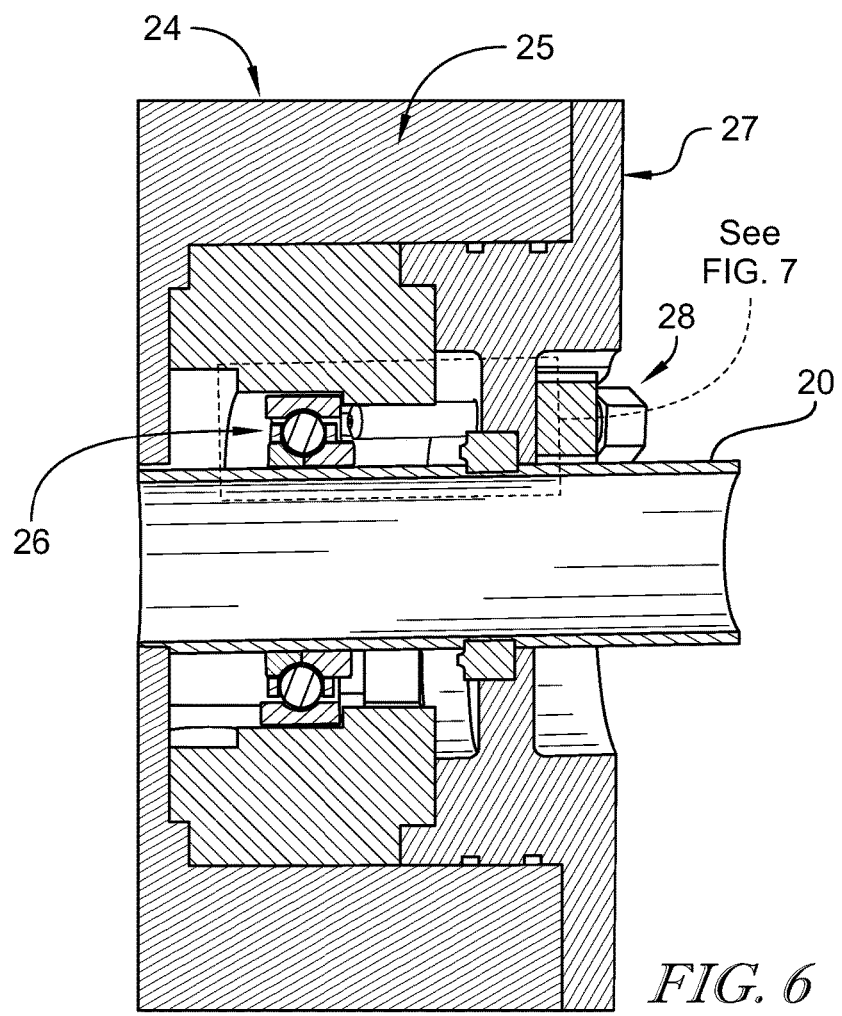
FIG. 6 is a side elevation and sectional view of the bearing system and the side-jet injector positioned in the cavity between the bearing housing and the rotor.
Figure 7:
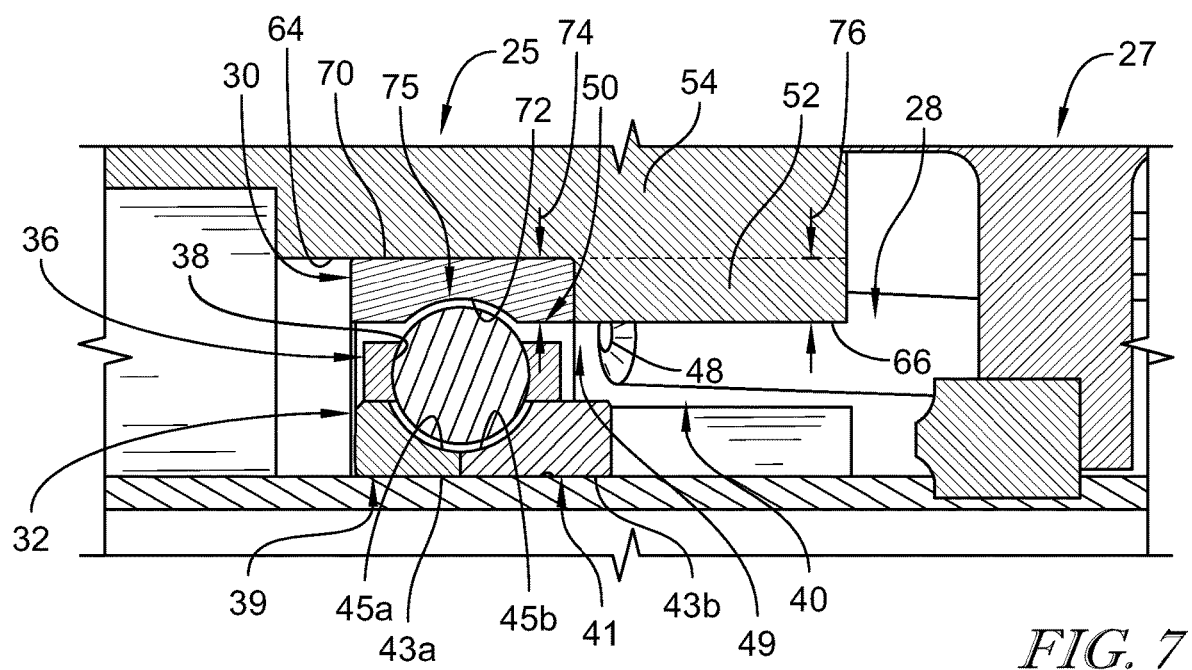
FIG. 7 is an enlarged view of the dashed portion of FIG. 6 showing that the oil injector includes an outlet positioned adjacent to a space between the inner race and the outer race and spaced apart from the plurality of rotating components by an air gap.

The outlet 48 of the side-jet injector 28 is spaced apart from the bearing unit 26 by an air gap 49 as shown in FIGS. 6 and 7. The side-jet injector 28 is configured to inject the stream of lubrication toward the bearing unit 26 to cross the air gap 49 and enter the bearing unit 26 through a space 50 formed between the inner race 32 and the cage 36. As the rotor 20 rotates about the central axis 11, windage 15 is formed in the cavity 40 and flows circumferentially around the axis 11 through the cavity 40. Often, the rotor 20 may reach speeds in a range of about 1.5 MDN and about 3 MDN such that a corresponding large amount of windage 15 is formed in the cavity 40. MDN is used to characterize bearing speed and is calculated, for example, by multiplying the bearing bore in millimeters by the shaft speed in rotations per minute and then dividing by one million. In some bearing assemblies, these speeds may impede the stream of lubrication from crossing the air gap 49 and entering the space 50. In some embodiments, the cage 36 may be removed such that the space is formed between the outer race 30 and the inner race 32.

The bearing system 22 in the illustrative embodiment is designed to facilitate the lubrication of the bearing unit 26 using the side-jet injector 28 in high-speed rotor applications as suggested in FIGS. 3 and 4. The case 25 of the bearing housing 24 includes a first wall section 52 and a second wall section 54 offset radially from the first wall section 52. The first wall section 52 is located a first radial distance from the central axis 11 while the second wall section 54 is located a second radial distance from the central axis 11 that is greater than the first radial distance. The second wall section 54 is located circumferentially downstream of the first wall section 52. The first wall section 52 and the second wall section 54 cooperate to define a pocket 53 circumferentially between ends of the first wall section 52 and radially inward from the second wall section 54.

The first wall section 52 and second wall section 54 establish a zone of stagnate fluid 46 in at least a portion of the pocket 53 as shown in FIGS. 3 and 4. The zone of stagnant fluid 46 is located radially between the rotor 20 and the second wall section 54 and circumferentially downstream of the first wall section 52. The outlet 48 of side-jet injector 28 is located circumferentially downstream of the first wall section 52 and radially between the rotor 20 and the second wall section 54. The first wall section 52 and the second wall section 54 are shaped to minimize the effects of the windage 15 on the stream of lubrication so that the stream of lubrication travels across the air gap 49 from the outlet 48 using the zone of stagnant fluid 46. In some embodiments, multiple pockets 53 may be defined by the first wall section 52 and the second wall section 54 to additional side-jet injectors.

The zone of stagnant fluid 46 has a boundary line 56 radially between the second wall section 54 and the rotor 20 as shown in FIG. 4. The outlet 48 of the side-jet injector 28 is positioned radially adjacent to the boundary line 56 of the zone of stagnant fluid 46. In the illustrative embodiment, the outlet 48 is positioned directly, radially below the boundary line 56 of the zone of stagnant fluid as represented in FIG. 4 by the solid circle 48a. However, in other embodiments, the outlet 48 of the side-jet injector 28 may be aligned radially with the boundary line 56 (see 48b) or located radially within the zone of stagnant fluid (see 48c). Additionally, the outlet 48 of the side-jet injector 28 is positioned directly downstream of a circumferential end of the first wall section so that the windage 15 is reduced or blocked from reaching the outlet 48.

The windage 15 in the cavity 40 generally has a flow profile 58 between the first wall section 52 and the rotor 20 as shown diagrammatically in FIG. 4. The flow profile 58 is established circumferentially around the entire cavity 40 and may change due to the offset provided by the first and second wall sections 52, 54 as suggested by flow profile 61. The velocity of the windage 15 is represented by the arrows within the profile 58. The windage 15 has a relatively large velocity near the rotor 20 and a relatively low velocity at a boundary layer 59 near the first wall section. The outlet 48 of the side jet injector is positioned at or near the boundary layer 59 to minimize the effects of the windage 15 on the stream of lubrication exiting the outlet 48. Similarly, the offset between the second wall section 54 and the rotor 20 increases the volume of the cavity 40 between the second wall section 54 and the rotor 20 to decrease the windage 15 experienced in the immediate area radially inward from the second wall section 54 (i.e. by establishing the zone of stagnant fluid 46).

The bearing housing 24 is sized to align radially the space 50 between the outer and inner races 30, 32 and the outlet 48 of the side-jet injector 28 so that the stream of lubrication is delivered directly into the space 50 as shown in FIGS. 3 and 4. In some embodiments, the space 50 may be aligned radially with at least a portion of the boundary line 56 as shown in FIG. 4. In other words, in the illustrative embodiment, the outlet 48, the space 50, and the boundary line 56 are all aligned radially such that the stream of lubrication is delivered directly through the space 50 and onto the rolling components 34 with the help of the zone of stagnant fluid 46.

In the illustrative embodiment, the second wall section 54 has a radially-inner surface 64 that extends circumferentially around the axis 11 to form a complete circle without interruption as suggested in FIG. 4. The first wall section 52 is a tab that extends radially inward from the second wall section 54 and has a radially-inner surface 66 that extends partially around the axis 11. The radially-inner surface 66 of the first wall section 52 forms a partial circle around the axis 11 with at least one interruption. The pocket 53 provides the interruption.

In another embodiment, the first wall section 52 and the second wall section 54 may each extend only partway around the central axis 11. In such an example, the first and second wall sections 52, 54 may cooperated to form a complete circle around the central. The outer race 30 may be coupled to the first wall section 52 and spaced apart radially from the second wall section 54.

The outer race 30 if the bearing unit 26 has a radially-outer surface 70 that is mounted to the radially-inner surface 64 of the second wall section 54 as shown in FIGS. 6 and 7. The outer race 30 also has a radially-inner surface 72 that is at least partially aligned radially with the radially-inner surface 66 of the first wall section 52. The outer race 30 has a first radial thickness 74 and the first wall section 52 has a second radial thickness 76 that is about equal to the first radial thickness 74 of the outer race 30. In one example. the outlet 48 of the side-jet injector 28 is positioned radially adjacent to the radially-inner surface 72 of the outer race 30 and the radially-inner surface 66 of the first wall section 52. In another example, the outlet 48 of the side-jet injector 28 is positioned directly inward of the radially-inner surface 72 of the outer race 30 and the radially-inner surface 66 of the first wall section 52.

In the illustrative embodiment, the side-jet injector 28 is configured to deliver the stream of the lubrication source at a velocity of about 100 feet per second and at a pressure of about 80 psi. However, in other embodiments any suitable velocity and pressure may be used.

The outer race 30 of the illustrative embodiment extends around the central axis 11 as a single annular member as shown in FIGS. 6 and 7. The radially-inner surface 72 includes an annular groove 75 that contacts the plurality of internal rotating components 34 and has a shape complimentary to the shape of the plurality of internal rotating components 34.

The inner race 32, as shown in FIGS. 6 and 7, includes a forward ring 39 and an aft ring 41 forming a radially outer surface 43a, 43b for engagement with the plurality of rotating components 34. The outer surfaces 43a, 43b define a groove formed partly of bearing surface portion 43a of the forward ring 39 and partly of bearing surface portion 43b of the aft ring 41. Radially-inner surfaces 45a, 45b are coupled directly to the rotor 20 such that the inner race 32 is mounted for rotation with the rotor 20.

In illustrative embodiments, high speed bearings may require complicated under race lubrication techniques to properly cool and lubricate the rolling elements and raceways. This requirement stems from the difficulties associated with obtaining acceptable capture efficiencies with other conventional methods of bearing lubrication, such as side jetting, at high speed operation. Side jet lubrication may be simple and may be easily integrated into gas turbine engine architectures as opposed to under race lubrication which often requires complex engine architectures to be developed and which result in more expensive components, additional components, and more constrained bearing cavities in terms of design flexibility. In illustrative embodiments, gas turbine engines may require smaller and faster engine cores. To aid in the reduction of complexity and cost in these systems, high speed side jetting may be used with the bearing housing disclosed herein to achieve 1.5 to 3.5 MDN.

In illustrative embodiments, windage within the sump (particularly around the bearing) may play a major role in the oil streams ability to make it to, and penetrate into, the bearing with a side jetting architecture 28. The oil may be shot out of the jet 28 at 100 ft/sec based on 80 psi oil pressure to a bearing 26 with an inner ring 32 rotation of about 29,400 rpm.

In illustrative embodiments, a more cost effective lubrication method (side jetting 28) to lubricate and cool a high speed bearing 26 is disclosed herein. The embodiments described herein may increase an amount of oil that crosses the air gap 49 between the oil jet 28 and the bearings 34. The illustrative embodiment may provide a more conducive environment for side jetting methods. Additionally, it should be noted that this disclosure is applicable for any components that require oil in high windage environments such as thrust bearings, roller bearings, gears, seal runners, etc.

In illustrative embodiments, one way to provide an air flow stagnation zone 46 is to design the static walls of the sump with a feature 52, 54 that either recesses the nozzle below the main windage flow or acts like a windage dam upstream of the oil jet 28. The oil jet stream is located within the boundary layer of the sump wall 52 which experiences significantly lower windage speeds than outside of the boundary layer. These lower windage speeds in the boundary layer allow the jet stream to more easily travel across the gap 49 between the oil nozzle 28 and the bearing 26. Additionally, by creating a pocket 53 in the sump wall for the oil jet to be recessed, flow separation occurs at the beginning of the pocket causing a stagnation area 46 for the jet stream to travel in.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A bearing system comprising
a bearing housing formed include a space therein,
a bearing coupled to the bearing housing and located in the space, the bearing being adapted to support a component rotating about a central axis relative to the bearing housing, and
a side-jet injector configured to provide lubrication to the bearing during rotation of the component and located in spaced-apart relation to the bearing and in a fixed position relative to the bearing and the bearing housing and configured to inject a stream of lubrication from an outlet formed in the side-jet injector in an axial direction toward the bearing,
wherein the bearing housing includes a first wall section located a first radial distance from the central axis and a second wall section located a relatively greater second radial distance from the central axis, the second wall section is located circumferentially downstream of the first wall section and the first and second wall sections cooperate to establish a zone of stagnate fluid radially between the component and the second wall section and circumferentially downstream of the first wall section, and the outlet of the side-jet injector is located circumferentially downstream of the first wall section and radially between an outer surface of the component and the second wall section such that effects to the stream of lubrication from windage established between the first wall section and the component are minimized.

2. The bearing system of claim 1, wherein the zone of stagnant fluid has a boundary line radially between an inner surface of the second wall section and an outer surface of the component and the outlet of the side-jet injector is positioned radially adjacent to the boundary line.

3. The bearing system of claim 2, wherein the space is aligned radially with the boundary line.

4. The bearing system of claim 2, wherein the outlet of the side-jet injector is located radially in the zone of stagnant fluid.

5. The bearing system of claim 1, wherein the zone of stagnant fluid has a boundary line radially between an inner surface of the second wall section and an outer surface of the component and the outlet of the side-jet injector is aligned radially with the boundary line.

6. The bearing system of claim 1, wherein the bearing includes an outer race coupled to the second wall section, an inner race coupled to the component, and a plurality of internal rotating members radially between the outer race and the inner race.

7. The bearing system of claim 6, wherein the outer race has a first radial thickness and the first wall section has a second radial thickness that is about equal to the first radial thickness.

8. The bearing system of claim 6, wherein an inner surface of the outer race is aligned with an inner surface of the first wall section.

9. The bearing system of claim 8, wherein the outlet of the side-jet injector is positioned radially adjacent to the inner surface of the outer race and the inner surface of the first wall section and wherein the outlet of the side-jet injector is positioned directly inward of the inner surface of the outer race and the inner surface of the first wall section.

10. The bearing system of claim 6, wherein the bearing further includes a cage and the space is defined radially between an inner surface of the outer race and an outer surface of the cage.

11. The bearing system of claim 1, wherein the second wall section forms a complete circle around the central axis and the first wall section extends only partway around the central axis.

12. A gas turbine engine comprising
a case formed to include a space therein,
a rotor located in the space and adapted for rotation in a first direction about a central axis relative to the case, the rotor being configured to generate a windage that flows in the first direction during rotation of the rotor about the central axis,
a bearing arranged to extend between and interconnect the rotor and the case to support the rotor, and
a side-jet injector configured to provide lubrication to the bearing during rotation of the rotor, the side-jet injector coupled to the case in a fixed position relative to the bearing and the rotor and configured to inject a stream of the lubrication from an outlet formed in the side-jet injector in an axial direction toward the bearing to lubricate and cool the bearing,
wherein the case includes a first wall section located a first radial distance from the central axis and a second wall section located a relatively greater second radial distance from the central axis, the second wall section is located circumferentially downstream of the first wall section and the first and second wall sections cooperate to establish a zone of stagnate fluid radially between the rotor and the second wall section and circumferentially downstream of the first wall section, and the outlet of the side-jet injector is located circumferentially downstream of the first wall section and radially between an outer surface of the rotor and the second wall section.

13. The gas turbine engine of claim 12, wherein the zone of stagnant fluid has a boundary line radially between an inner surface of the second wall section and an outer surface of the rotor and the outlet of the side-jet injector is positioned radially adjacent to the boundary line.

14. The gas turbine engine of claim 13, wherein the outlet of the side-jet injector is located radially in the zone of stagnant fluid.

15. The gas turbine engine of claim 12, wherein the zone of stagnant fluid has a boundary line radially between an inner surface of the second wall section and an outer surface of the rotor and the outlet of the side-jet injector is aligned radially with the boundary line.

16. The gas turbine engine of claim 15, wherein the space is aligned radially with the boundary line.

17. The gas turbine engine of claim 12, wherein the bearing includes an outer race coupled to the second wall section, an inner race coupled to the rotor, and a plurality of internal rotating members radially between the outer race and the inner race and wherein an inner surface of the outer race is aligned with an inner surface of the first wall section.

18. The gas turbine engine of claim 12, wherein the second wall section forms a complete circle around the central axis and the first wall section extends only partway around the central axis.

19. The gas turbine engine of claim 17, wherein the outlet of the side-jet injector is positioned radially adjacent to the inner surface of the outer race and the inner surface of the first wall section and wherein the outlet of the side-jet injector is positioned directly inward of the inner surface of the outer race and the inner surface of the first wall section.

20. The gas turbine engine of claim 12, wherein the bearing includes an outer race coupled to the second wall section, an inner race coupled to the rotor, and a plurality of internal rotating members radially between the outer race and the inner race and wherein the bearing further includes a cage and the space is defined radially between an inner surface of the outer race and an outer surface of the cage.

* * * * *